(12) United States Patent
Jones et al.

(10) Patent No.: US 10,242,266 B2
(45) Date of Patent: Mar. 26, 2019

(54) METHOD AND SYSTEM FOR DETECTING ACTIONS IN VIDEOS

(71) Applicant: Mitsubishi Electric Research Laboratories, Inc., Cambridge, MA (US)

(72) Inventors: Michael J Jones, Belmont, MA (US); Tim Marks, Newton, MA (US); Oncel Tuzel, Winchester, MA (US); Bharat Singh, Hyattsville, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 292 days.

(21) Appl. No.: 15/058,264

(22) Filed: Mar. 2, 2016

(65) Prior Publication Data
US 2017/0255832 A1 Sep. 7, 2017

(51) Int. Cl.
G06K 9/00 (2006.01)
G06K 9/46 (2006.01)
G06K 9/66 (2006.01)
G06T 7/20 (2017.01)

(52) U.S. Cl.
CPC ..... *G06K 9/00771* (2013.01); *G06K 9/00718* (2013.01); *G06K 9/4628* (2013.01); *G06K 9/66* (2013.01); *G06T 7/20* (2013.01); *G06K 2209/19* (2013.01); *G06T 2207/10016* (2013.01); *G06T 2207/20081* (2013.01); *G06T 2207/30232* (2013.01)

(58) Field of Classification Search
None
See application file for complete search history.

(56) References Cited

U.S. PATENT DOCUMENTS

| 8,345,984 B2 | 1/2013 | Ji et al. |
| 2005/0157908 A1 | 7/2005 | Matsugu et al. |
| 2017/0249515 A1* | 8/2017 | Bai ............... G06K 9/00751 |

FOREIGN PATENT DOCUMENTS

CN 103593661 2/2014

OTHER PUBLICATIONS

Gkioxari et al., "Finding Action Tubes", 2015 IEEE Conference on Computer Vision and Pattern Recognition (CVPR), Jun. 7-12, 2015, pp. 759-768.*

(Continued)

*Primary Examiner* — Matthew C Bella
*Assistant Examiner* — Jose Torres
(74) *Attorney, Agent, or Firm* — Gene Vinokur; James McAleenan; Hironori Tsukamoto

(57) ABSTRACT

A method and system detects actions of an object in a scene by first acquiring a video of the scene as a sequence of images, wherein each image includes pixels, wherein the video is partitioned into chunks. The object in the video is tracked. For each object and each chunk of the video, trajectories of the pixels within a bounding box located over the object are tracked, and cropped trajectories and cropped images for one or more images in the chunk are produced using the bounding box. Then, the cropped trajectories and cropped images are passed to a recurrent neural network (RNN) that outputs a relative score for each action of interest.

19 Claims, 4 Drawing Sheets

(56) References Cited

OTHER PUBLICATIONS

Philippe Weinzaepfel, Zaid Harchaoui, Cordelia Schmid. Learning to track for spatio-temporal action localization. ICCV 2015—IEEE International Conference on Computer Vision, Dec. 2015, Santiago, Chile.

Simonyan et al., Two-stream convolutional networks for action recognition in videos, in Advances in Neural Information Processing Systems, pp. 568-576, 2014.

M. Baccouche, F. Mamalet, C. Wolf, C. Garcia, and A. Baskurt. Sequential deep learning for human action recognition. In Human Behavior Understanding, pp. 29â€39. Springer, 2011.

Hochreiter et al. "Long Short-Term Memory," Neural Computation 9(8): 1735-1780, 1997.

Grushin et al. "Robust Human Action Recognition via Long Short-Term Memory," Conference Paper, Jul. 2013. Neural Networks IJCNN, The 2013 International Joint Conference on. DOI: 10.1109/IJCNN.2013.6706797.

Rohrbach et al. "A Database for Fine Grained Activity Detection of Cooking Activities," Proc. of the IEEE Conf. on Computer Vision and Pattern Recognition (CVPR), Providence, Rhode Island, Jun. 2012.

Weinzaepfel Philippe et al. "Learning to Track for Spatio-Temporal Action Localization," 2015 IEEE international conference on computer vision (ICCV), Dec. 7, 2015, p. 3164-3172. IEEE, Los Alamitos, CA, US.

Chen Sun et al. "Temporal Localization of Fine Grained Actions in Videos by Domain Transfer for Web Images," Proceedings of the 2015 ACM Multimedia Conference, Oct. 13, 2015. p. 371-380.

Singh Bharat et al. "A multi-stream bi-directional recurrent neural network for fine-grained action detection," 2016 IEEE Conference on computer vision and pattern recognition (CVPR) Jun. 27, 2016. p. 1961-1970.

Zuxuan et al. "<odeling Spatial Temporal Clues in a Hybrid Deep Learning Framework for Video Classification," Proceedings of the 2015 ACM Multimedia Conference, Oct. 13, 2015. p. 461-470.

Yeung et al. "End to end learning of action detection from frame glimpses in videos," Nov. 22, 2015. https://arxiv.org/pdf/1511.06984v1.pdf.

* cited by examiner

METHOD AND SYSTEM FOR DETECTING ACTIONS IN VIDEOS

FIELD OF THE INVENTION

This invention relates generally to computer vision and camera surveillance applications, and more particularly to detecting instances of objects, such as people, performing certain actions of interest in videos.

BACKGROUND OF THE INVENTION

In computer vision and camera surveillance applications, a frequent problem is recognizing and detecting certain actions performed by objects such as people, machinery, vehicles, robots, etc. There has been a fair amount of work on the general problem of analyzing actions in videos, but most of the prior art work has focused on action recognition rather than on action detection.

Action recognition refers to classifying, i.e., recognizing, which action is being performed in a video segment that has been temporally trimmed so that the segment starts at or near the beginning of an action and ends at or near the end of the action. We use the term temporally trimmed to refer to such video segments. Action detection refers to a temporal or spatio-temporal localization of every occurrence of each action from a known set of action classes occurring in a long, i.e., not temporally trimmed, video sequence.

Early work on action detection includes methods that detect walking people by analyzing appearance and motion patterns. Several methods are known for detecting actions using spatio-temporal interest points, multiple instance learning, or part-based models.

Related to action recognition is the task of activity recognition. In an activity recognition task, a video segment that depicts an activity, such as a particular sport being played, is analyzed, and the goal is to determine which activity (e.g., which sport) is depicted in the video.

Fine-grained action detection refers to action detection in which the differences among the classes of actions to be detected are small. For instance, in a cooking scenario, detecting actions from a set that includes similar actions such as chopping, grating, and peeling is an example of fine-grained action detection.

Conventional methods for video analysis tasks, such as action recognition, event detection, and video retrieval, typically use hand-crafted features, such as Histogram of Oriented Gradients (HOG), Motion Boundary Histogram (MBH), and Histogram of Optical Flow (HOF). One method computes Improved Dense Trajectories (IDT) on each input video, then computes a Fisher vector for the video and performs classification using a support vector machine (SVM). In fact, shallow architectures using Fisher vectors yield good results for action and activity recognition.

The results can be improved when hand-crafted features such as the ones mentioned above are replaced by "deep" features that are determined by neural networks. The input to the neural networks can includes images and stacked optical flow along trajectories. One method uses a two-stream network, in which images (a first stream) and stacked optical flow fields that are determined over a small number of images (a second stream) are input to a deep neural network for action recognition. A similar architecture can be used to incorporate spatial localization into the task of action recognition in temporally trimmed videos. However, these networks do not learn long-term sequence information from videos.

Recurrent Neural Networks

Because recurrent neural networks (RNNs) can learn long-term sequence information in a data-driven manner, RNNs have been used for action recognition. A 3D convolutional neural network followed by a Long Short-Term Memory (LSTM) classifier can be used for action recognition. LSTMs can improve performance over a two-stream network for action recognition. Bi-directional LSTMs have been used to recognize actions from a sequence of three-dimensional human joint coordinates.

For action recognition, methods that use deep neural networks and LSTMs for action recognition perform only slightly better than methods that use shallow Fisher vectors generated from hand-crafted features.

Although substantial progress has been made in action recognition, not as much work has been done on action detection, i.e., temporal or spatio-temporal localization of actions in longer videos that are not temporally trimmed. Tracking has been used to help with spatial localization of actions in sports videos. There, proposed trajectories are generated, and then hand-crafted features are determined over the trajectories.

Using annotations for the objects being interacted with, or enforcing a grammar over the high-level activities being performed is generally helpful, although those techniques can require learning extra detectors for objects and having prior knowledge about the high-level activities.

For fine-grained action detection, extracting dense trajectories from spatio-temporal regions of interest or using trajectories of a person's hands can significantly improve performance.

One of the main deficiencies of prior-art methods for automatic analysis of actions in a video is a lack of focus on action detection. Instead, most prior methods focus on action recognition, which means that most methods cannot localize an action temporally or spatio-temporally. This may be because action recognition is an easier problem than action detection.

However, action recognition has much less practical value than action detection, because to temporally trim a video segment to include just a single action, which is a prerequisite for action recognition, the action must already be detected before the video is trimmed. Temporally untrimmed videos are much more common in real applications.

Another deficiency of prior-art methods for action detection is a relatively low accuracy. That is, the performance of prior-art action detection methods is not good enough for most computer vision applications.

SUMMARY OF THE INVENTION

The embodiments of the invention provide a method and system for detecting actions of objects in a video, where the objects can be people, animals, machinery, vehicles, robots, etc. For example, the object could be a person or an industrial robot in a factory setting. The primary problem addressed by the invention is to provide more accurate action detection for actions of objects that occur in videos that are not temporally trimmed.

The embodiments provide a method for action detection in videos that uses a deep neural network with recurrent connections and takes as input a cropped image, which has been cropped using a bounding box around a tracked object, as well as a sequence of cropped optical flow fields that characterize the motion within the cropped image tracked across multiple video frames.

Herein, we consider a video to be acquired as a sequence of images. In some embodiments, the video may be acquired initially in some other form, then converted into a sequence of images. We sometimes refer to a video as a video sequence or image sequence. We refer to the images that make up the video as video images or video frames, or more briefly as images or frames.

Features of our Method

Features included in various embodiments of our method include the following.

An object tracker (e.g., a person tracker) that spatially localizes where the action takes place within the video images. Most prior-art methods analyze motion and appearance over an entire spatial extent of the images, which often includes too much information that is irrelevant to localized actions.

Pixel trajectories, a representation of motion information in which the displacement of each scene point is represented at the same image location over multiple frames, even if the scene point is moving in the video (e.g., a moving part of a person). Pixel trajectories directly represent point correspondences across video images. In contrast, most prior art methods represent motion information using simple stacked optical flow, which does not represent the point correspondences across images.

A recurrent neural network (RNN), which learns important temporal dynamics over many video images that help to detect different actions.

A multi-stream convolutional neural network which, in addition to computing important features of motion (in a first stream) and features of appearance (in a second stream) for the video that has been cropped at each image based on output from the object tracker, also computes features of motion (in a third stream) and features of appearance (in a fourth stream) for video frames that include the entire spatial extent of the video image, i.e., uncropped images. Here, multi-stream refers to four streams: a motion stream and an appearance stream for the video that is cropped around the tracked object's location, and a motion stream and an appearance stream for the full-image video.

A Long Short-Term Memory (LSTM) network, included as one or more layers of the RNN, which can learn patterns with longer temporal duration than can be learned using a conventional RNN. The method can provide better performance using a bi-directional LSTM, which means that the method detects actions using information from past and future video frames.

DETAILED DESCRIPTION OF THE PREFERRED EMBODIMENTS

The embodiments of our invention provide a method and system for detecting actions of objects in a video.

The method includes a training phase and a testing phase. Some embodiments include only a testing phase. For example, a method with only test phase could be embedded in a small device that makes use of a previously trained RNN.

Figure 1:
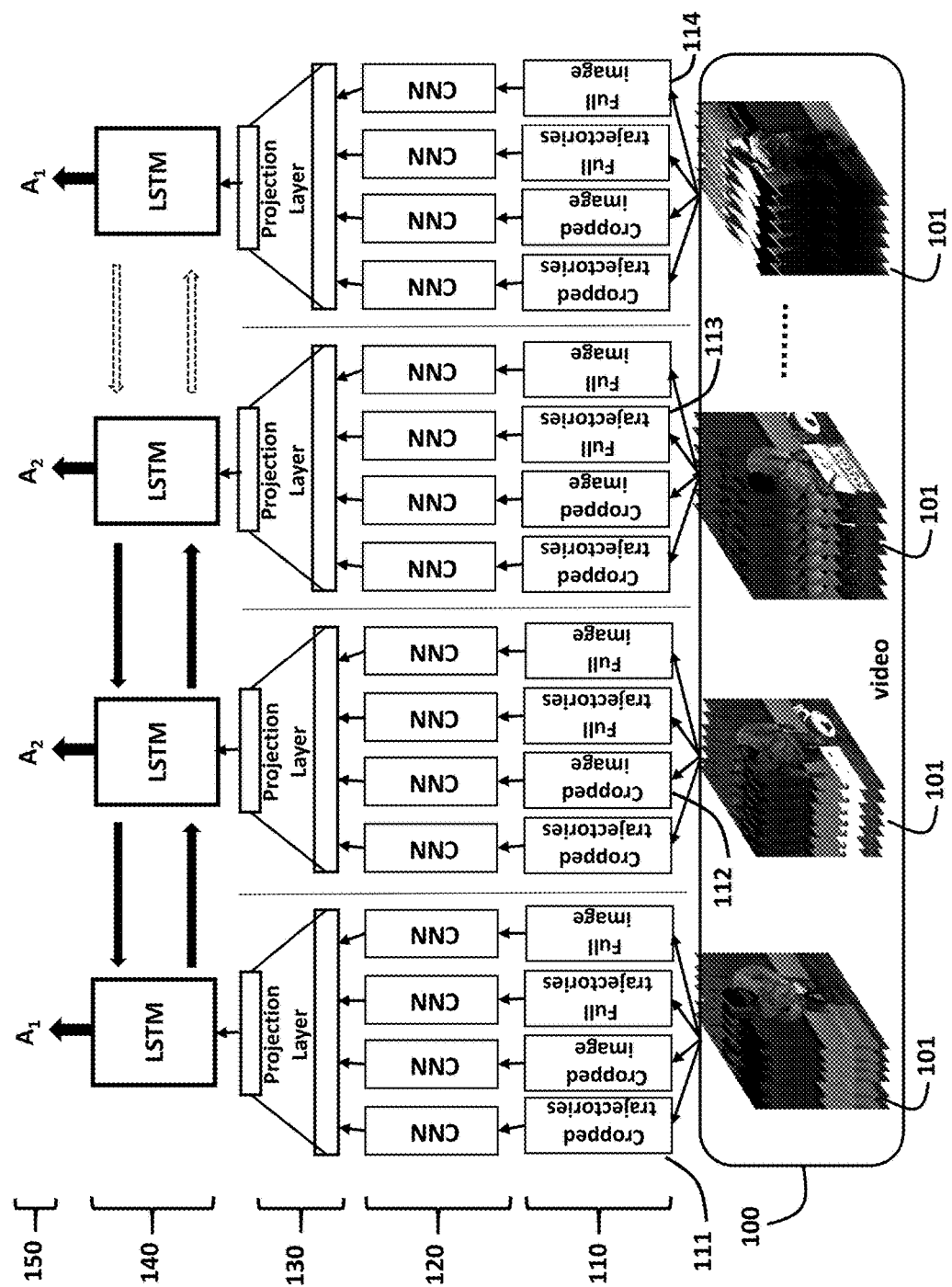
FIG. 1 is a schematic of a recurrent neural network (RNN) that includes a multi-stream convolutional neural network (CNN) as its initial layers and a Long Short-Term Memory (LSTM) network as its final layer or layers, according to embodiments of the invention.

During the training phase, we train four independent convolutional neural networks (CNNs) 120, as shown in FIG. 1. Each CNN processes one of four streams 110: a motion stream 111 and an appearance stream 112 for video images that are cropped around the location of a tracked object, and a motion stream 113 and an appearance stream 114 for the full-frame (not spatially cropped) video images. Some embodiments have only two streams: a motion stream 111 and an appearance stream 112 for video images that are cropped around the location of a tracked object. This might be useful, for example, for cases in which the background scene is noisy, nondescript, or otherwise unrelated to the actions being performed by the object.

In the preferred embodiments, each convolutional network (CNN) uses a VGG (Visual Geometry Group) architecture, see Simonyan et al., "Two-stream convolutional networks for action recognition in videos," Advances in Neural Information Processing Systems, pages 568-576, 2014. However, other CNN architectures could also be used for each stream, such as the AlexNet architecture, see Krizhevsky et al., "ImageNet Classification with Deep Convolutional Neural Networks," Advances in Neural Information Processing Systems, 2012.

The four networks perform the task of action classification on successive small chunks 101 of a video 100. For example, each chunk could consist of six consecutive video frames. The CNNs are followed by a projection layer 130, which projects the outputs of all of the streams' CNNs into a single space, and Long Short-Term Memory (LSTM) cells 140. The output for each chunk is a detected action class 150 from a set of N action classes $A_1, A_2, \ldots, A_N$.

Two convolutional neural networks (CNNs), one each for images and motion, are trained on chunks consisting of video frames that have been cropped to a bounding box of a tracked object. The cropped frames provide actions with a bounding box that is restricted to the neighborhood of the actions, which helps in classifying the actions. In some embodiments, this bounding box has a fixed size in pixels, which helps to align objects over multiple performances of an action.

In some preferred embodiments, two additional CNNs, one each for images and motion, are trained on chunks consisting of video frames that are not spatially cropped, i.e., each frame is a full frame of the video, so that a spatial context of the action being performed within a scene is preserved. We refer to the network as a multi-stream neural network because it has multiple (e.g., four) CNNs, each of which processes a different stream of information from the video.

After these four networks 120 have been trained, we learn a fully-connected projection layer 130 on top of the fc7 layer outputs of the four networks to create a joint representation for these independent streams. The fc7 layer is the last fully connected layer in the VGG network. The multi-stream network is provided with the full-length video 100, arranged as a temporal sequence of chunks 101, and the corresponding temporal sequence of outputs of the projection layers are then fed into the Long Short-Term Memory (LSTM) network 140 running in two directions i.e., the LSTM network is bi-directional.

The bi-directional LSTM network consists of two directional LSTM networks (one connected forwards in time, the other connected backwards in time). In some embodiments, each of the two directional LSTM networks is followed by a fully-connected layer, for clarity not shown in FIG. 1, on top of each directional LSTM network's hidden states, followed by a softmax layer, to obtain intermediate scores corresponding to each action. Finally, the scores for the two directional LSTMs are combined, e.g., averaged, to obtain scores for each specific actions.

There are multiple components in an action detection pipeline that are critical for achieving good performance. In this task, we use a model that characterizes spatial and long-term temporal information that are present in the video.

Object trajectories determined using bounding boxes provide a reference image that makes many actions easier to learn by removing location variation from the input representation. Some actions, however, are location dependent. For scenes acquired using a static video camera, these actions always occur at the same image location. For example, washing and rinsing are almost always done near a sink, and opening a door would most likely be performed near a refrigerator or a cupboard. For these reasons, we train two separate deep networks on cropped and uncropped chunks of pixel trajectories and video frames.

The first two CNNs are trained on cropped images, cropped using boxes from the object tracker, to reduce background noise and to provide an object-centric reference image for trajectories and image regions. The other two CNNs are trained on the entire (spatially full-frame) images to preserve global spatial context.

Figure 2:
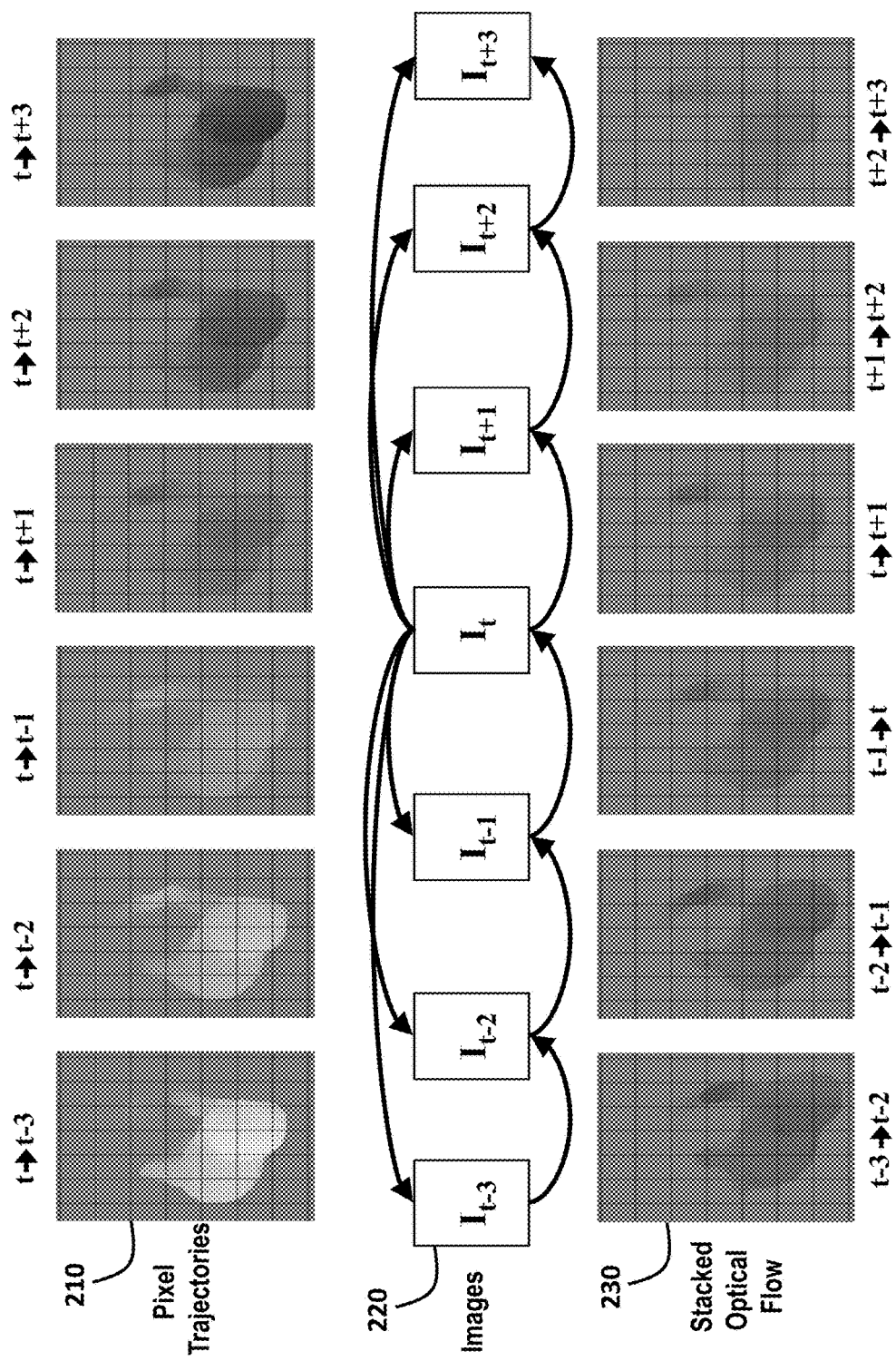
FIG. 2 is a schematic comparing our method's pixel trajectories as compared to conventional stacked optical flow, according to embodiments of the invention.

As shown in FIG. 2, we represent short-term motion information using pixel trajectories 210, in which each moving scene point is in positional correspondence with itself across several images 220. This alignment enables pixel trajectories to characterize much richer motion information than conventional stacked optical flow fields 230.

Because the actions to be detected can have a wide range of durations, our method uses the LSTMs 140 to learn the duration and long-term temporal context of actions in a data-driven fashion. Our results demonstrate that LSTMs are quite effective in learning long-term temporal context for fine-grained action detection.

Tracking for Fine-Grained Action Detection

To provide a bounding box around an object for the location-independent (cropped) appearance and motion streams, any object-tracking method could be used. In a preferred embodiment, we use a state-based tracker to spatially localize actions in the video. Keeping the size of the tracked bounding box fixed, we update the position of the bounding box so that a magnitude of optical flow inside the bounding box is maximized. If the magnitude of the optical flow is greater than a threshold, then the location of the bounding box updated to match the location that maximizes the magnitude of optical flow. Otherwise, the object is either moving slowly or not at all. When the object is moving too slowly or is not moving, the bounding box from the previous chunk is used. The location of the bounding box is updated only after the chunk 101 (e.g., six images) is processed and flow and appearance features are determined relative to the chunk, to ensure that the bounding box is stationary over all of the images in the chunk.

Our tracking method can be effectively applied when the camera is stationary, and we have a reasonable estimate about the size of the object. This is a practical assumption for many videos taken at retail stores, individual homes, or in a surveillance setting where fine-grained action detection is likely to be used. For more difficult tracking situations, a more sophisticated tracker can be used.

In preferred embodiments, the bounding box is a rectangular region containing the object, but the bounding box does not need to be rectangular. More generally, the bounding box is a region of any shape that contains or largely contains the object being tracked, and that may additionally contain a small region around the object.

Pixel Trajectories

Stacking optical flow as an input to the deep network has been a conventional practice to train motion-based networks. However, in a stacked optical flow, the motion vectors corresponding to a particular moving point in the scene, e.g., the tip of a finger, change their pixel location from one image to the next. Thus, the convolutional neural network needs to learn the spatial movement of optical flow for classifying an action. The complete motion information could be learned by the network at a higher layer, but that would require more parameters and data to learn.

As shown in FIG. 2, our representation for motion in a sequence of images 220 (e.g., in a chunk) is to determine optical flow from a central image $I_t$, to each of the K previous and K subsequent images (e.g., K=3). We call this representation of the motion pixel trajectories 210. In all 2K images of a pixel trajectory, the flow values from each pixel to the corresponding pixel in image $I_t$ are all located at the pixel's location in image $I_t$. In pixel trajectories 210, only the intensity of the optical flow image (representing the magnitude of the optical flow in the vertical direction) changes, while the spatial layout is fixed. In stacked optical flow 230, however, the spatial correspondence between pixels is lost. For example, the back of the head (lowest point of the silhouette) remains at the same location in subsequent pixel trajectory images, but it moves up and to the left in subsequent stacked optical flow images. Thus, the network can learn a temporal filter for each pixel more easily from pixel trajectories than is possible using stacked optical flow fields.

For each pixel in image $I_t$, we have the complete motion information over a short interval of time. To determine motion patterns for each pixel, a 1×2K convolutional kernel on the pixel trajectories can produce a feature map for the movement of each pixel. In contrast, a network layer that inputs stacked optical flow, using, e.g., a 3×3×2K kernel on stacked optical flow, cannot learn motion patterns using the first convolutional layer for pixels that have a displacement of more than 3 pixels over 2K images. For fine-grained action detection with a stationary camera, we have demonstrated that pixel trajectories perform better than stacked optical flow.

Action Detection on Long Sequences using a Bi-Directional LSTM Network

We now provide a brief description of Recurrent Neural Networks (RNNs) and Long Short-Term Memory (LSTM) cells. Given an input sequence, $x=(x_1, \ldots, x_T)$, an RNN uses a hidden state representation $h=(h_1, \ldots, h_T)$ so that the RNN can map the input x to an output sequence $y=(y_1, \ldots, y_T)$.

To determine this representation, the RNN iterates through the following recurrence equations:

$$h_t = g(W_{xh}x_t + W_{hh}h_{t-1} + b_h), \quad y_t = g(W_{hy}h_t + b_z),$$

where g is an activation function, $W_{xh}$ is a weight matrix that maps the input to the hidden state, $W_{hh}$ is a transition matrix between hidden states at two adjacent time steps, $W_{hy}$ is a matrix that maps the hidden state h to the output y, and $b_h$ and $b_z$ are bias terms.

Unlike hidden Markov models (HMMs), which use discrete hidden state representations, recurrent neural networks use a continuous-space representation for the hidden states. However, it is difficult to train RNNs to learn long-term sequence information because training is performed by unrolling the network using back-propagation through time. This leads to either a vanishing or exploding gradient problem.

Figure 3:
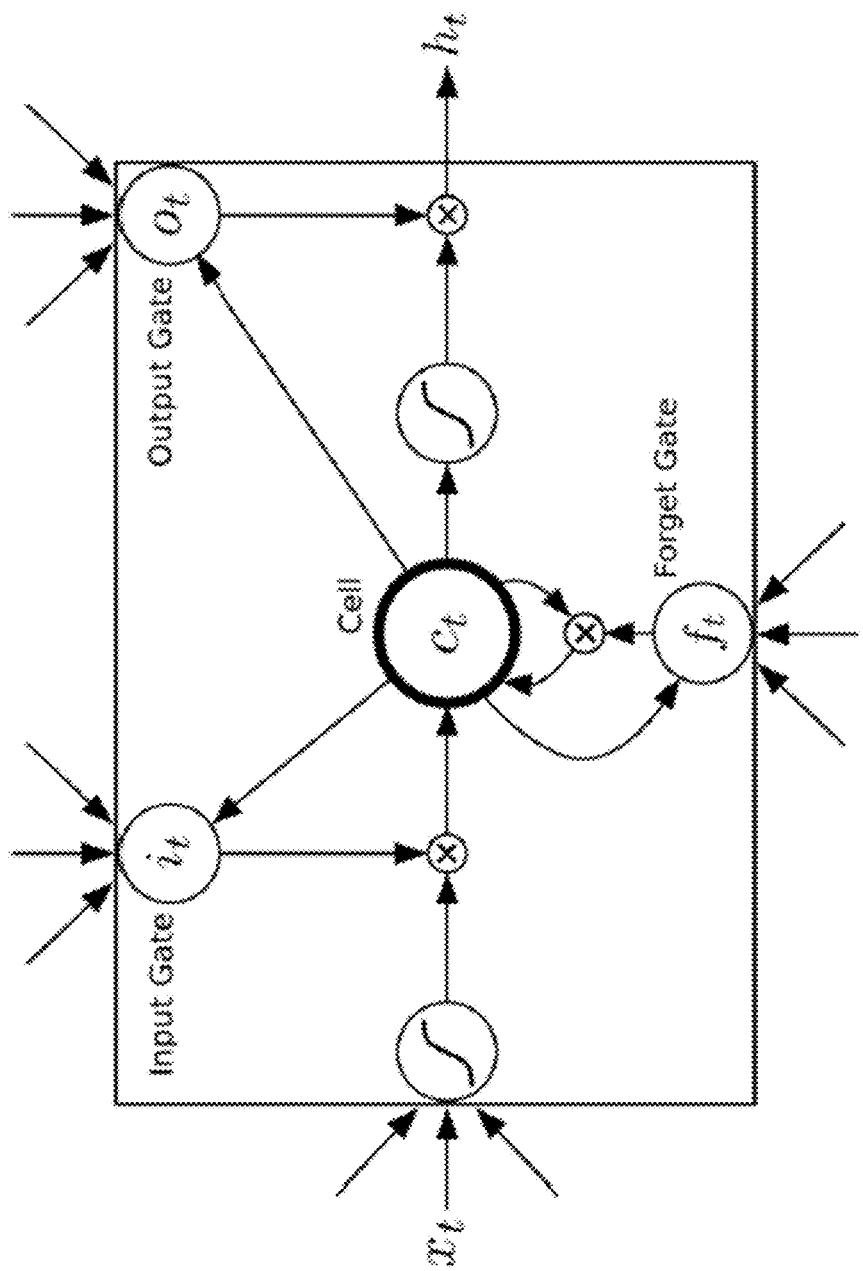
FIG. 3 is a schematic of an LSTM cell, according to embodiments of the invention.

As shown in FIG. 3, to avoid this problem, an LSTM cell has a memory cell $c_t$ and a forget gate $f_t$ that help the LSTM learn when to retain the previous state and when to forget the state. This enables the LSTM network to learn long-term temporal information. The weight update equations for the LSTM cell are as follows:

$$i_t = \sigma(W_{xi} x_t + W_{hi} h_{t-1} + b_i)$$

$$f_t = \sigma(W_{xf} x_t + W_{hf} h_{t-1} + b_f)$$

$$o_t = \sigma(W_{xo} x_t + W_{ho} h_{t-1} + b_o)$$

$$g_t = \tan h(W_{xc} x_t + W_{hc} h_{t-1} + b_c)$$

$$c_t = f_t c_{t-1} + i_t g_t$$

$$h_t = o_t \tan h(c_t)$$

where $\sigma$ is a sigmoid function, tan h is the hyperbolic tangent function, and $i_t$, $f_t$, $o_t$, and $c_t$ are the input gate, forget gate, output gate, and memory cell activation vectors, respectively.

The forget gate $f_t$ decides when (and which) information is cleared from the memory cell $c_t$. The input gate $i_t$ decides when (and which) new information is be incorporated into the memory. The tan h layer $g_t$ generates a candidate set of values, which are added to the memory cell when permitted by the input gate.

Based on the output of the forget gate $f_t$, input gate $i_t$, and the new candidate values $g_t$, the memory cell $c_t$ is updated. The output gate $o_t$ controls which information in the memory cell is used as a representation for the hidden state. The hidden state is represented as a product between a function of the memory cell state and the output gate.

LSTM architectures for RNNs have been successfully used for sentence generation from images, video to text, and in speech recognition. For the task of action recognition, however, the performance of LSTM networks is still close to that of a classifier based on Fisher vectors generated over improved dense trajectories. It may be due to their lackluster performance on action recognition from video that RNNs using LSTMs have not been used for action detection from video.

In commonly used action recognition datasets, videos are temporally trimmed to start and end at or near the start and end times of each action. The temporally trimmed videos are generally short in length, e.g., from 2-20 seconds. Hence, in the action recognition task, there is not enough long-term context to be learned in a data-driven manner. This long-term context can include properties such as the expected duration of an action, which action follows or precedes another action, and other long-term motion patterns that extend temporally beyond action boundaries.

Thus in an action recognition task, the LSTM network has little access to the longer-term temporal context. In fine-grained action detection, however, videos are typically on the order of minutes or hours. Thus, we had the key insight that LSTM networks would be more suited to action detection (to which we applied them) than to action recognition (to which they were previously applied), because LSTMs model long-term temporal dynamics in a sequence.

Bi-directional LSTM networks integrate information from both future chunks and past chunks to make a prediction for each chunk in the video sequence. Therefore, we predicted that bi-directional LSTM networks would be better than a uni-directional LSTM at predicting the temporal boundaries (i.e., the beginning and end) of an action.

As described herein, the forward and backward LSTM networks each produce a softmax score for every action class, and we average the softmax scores of the two LSTM networks to obtain the score (probability) for each action.

While training the LSTM networks on long sequences, back-propagation through time can only be done up to a fixed number of steps, using a short sequence of chunks. To preserve long-term context, we retain the hidden state of the last element in the previous sequence when training on the subsequent sequence.

Method and System Overview

As previously described, a training phase of the method involves training a recurrent neural network (RNN). In the testing phase, i.e., action detection, an already-trained RNN is used to detect actions of objects.

Figure 4:
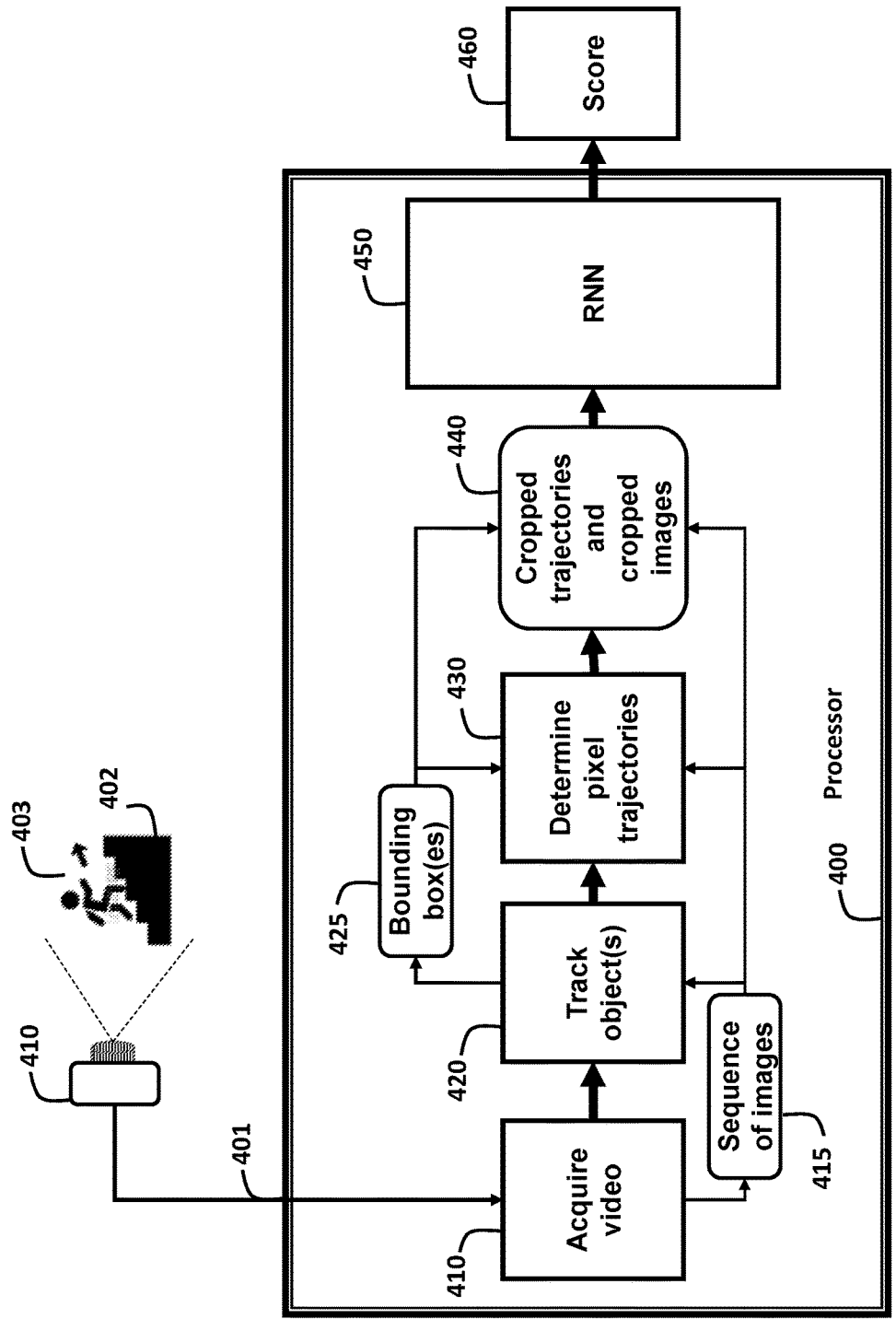
FIG. 4 is schematic of a method and system for detecting actions of objects according to embodiments of the invention.

FIG. 4 shows the basic operation of the method and system for detecting actions of objects, such as detecting people in a scene performing specific actions. A video 401 is acquired 410 of a scene 402 as a sequence of images 415, wherein each image includes pixels. The scene can include one or more objects 403 performing actions, e.g., a person running up stairs. One or more of the objects are tracked 420, and a bounding box 425 of the tracked object is estimated in each chunk of video images. For example, a chunk can be a sequence of six images.

The images are cropped to the extent of the bounding box, and pixel trajectories are computed 430 within the bounding box. The resulting cropped trajectories and cropped images 440 are passed to a recurrent neural network (RNN) 450 that has been trained to output a relative score 460 for each action of interest.

The steps can be performed in a processor 400 connected to memory, a camera, and input/output interfaces as known in the art.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting actions of an object in a scene, comprising steps:
    acquiring a video of the scene as a sequence of images, wherein each image includes pixels, wherein the video is partitioned into chunks;
    tracking the object in the video, and for each object and each chunk of the video, further comprising:
        determining trajectories of the pixels within a bounding box located over the object, wherein the trajectories for the pixels are determined from a central image in the chunk to each of K previous and K subsequent images;
        using the bounding box to produce cropped trajectories and cropped images for one or more images in the chunk; and
        passing the cropped trajectories and cropped images to a recurrent neural network (RNN) that outputs a relative score for each action of interest, wherein the RNN includes convolutional neural network (CNN) layers and one or more recurrent neural network layers, wherein the steps are performed in a processor.

2. The method of claim 1, wherein the convolutional neural network layers operate on multiple streams, including the cropped trajectories and the cropped images as well as trajectories and images that have an entire spatial extent of the video.

3. The method of claim 2, wherein the recurrent neural network layers include bi-directional Long Short-Term Memory LSTM cells.

4. The method of claim 1, wherein the recurrent neural network layers include Long Short-Term Memory (LSTM) cells.

5. The method of claim 1, wherein the trajectories are encoded as pixel trajectories.

6. The method of claim 1, wherein the trajectories are encodes as stacked optical flow.

7. The method of claim 1, wherein the tracking includes selecting a bounding box that maximizes a magnitude of a stacked optical flow inside the bounding box.

8. The method of claim 7, wherein the tracking further comprises:
updating a location of the bounding box if a magnitude of the stacked optical flow inside the bounding box is greater than a threshold.

9. The method of claim 1, wherein K is 3.

10. The method of claim 1, wherein a motion pattern for each pixel is determined using a 1×2K convolutional kernel.

11. The method of claim 1, wherein the method is used for fine-grained action detection in the video.

12. The method of claim 1, wherein the method includes training the RNN prior to the detecting.

13. The method of claim 1, wherein the RNN has been previously trained.

14. The method of claim 1, wherein the detecting comprises temporal action detection.

15. The method of claim 1, wherein the detecting comprises spatio-temporal action detection.

16. The method of claim 1, wherein the video is initially acquired in some form other than a sequence of images, and is converted to a sequence of images.

17. The method of claim 1, in which the object is one of a person, a robot or an industrial robot.

18. A system for detecting actions of an object in a scene, comprising:
an input interface to acquire a video of the scene as a sequence of images from a video camera, wherein each image includes pixels, wherein the video is partitioned into chunks; and
a processor configured to track the object in the video, and for each object and each chunk of the video further comprising:
determine trajectories of the pixels within a bounding box located over the object, wherein the trajectories for the pixels are determined from a central image in the chunk to each of K previous and K subsequent images;
use the bounding box to produce cropped trajectories and cropped images for one or more images in the chunk; and
pass the cropped trajectories and cropped images to a recurrent neural network (RNN) that outputs a relative score for each action of interest, wherein the RNN includes convolutional neural network (CNN) layers and one or more recurrent neural network layers.

19. A method for detecting actions of an object in a scene, wherein the detecting includes detecting spatio-temporal action detection, comprising steps:
acquiring a video of the scene as a sequence of images via an input interface, wherein each image includes pixels, wherein the video is partitioned into chunks;
tracking the object in the video, and
for each object and each chunk of the video, further comprising:
determining trajectories of the pixels within a bounding box located over the object, wherein the trajectories for the pixels are determined from a central image in the chunk to each of K previous and K subsequent images;
using the bounding box to produce cropped trajectories and cropped images for one or more images in the chunk; and
passing the cropped trajectories and cropped images to a recurrent neural network (RNN) that outputs a relative score for each action of interest, wherein the RNN includes convolutional neural network (CNN) layers and one or more recurrent neural network layers, the CNN layers operate on multiple streams, including the cropped trajectories and the cropped images as well as trajectories and images that have an entire spatial extent of the video, wherein the steps are performed in a processor in communication with the input interface.

* * * * *